(12) United States Patent
Awano et al.

(10) Patent No.: US 9,286,881 B2
(45) Date of Patent: Mar. 15, 2016

(54) ECHO CANCELER AND ECHO DETECTOR

(75) Inventors: Tomoharu Awano, Tokyo (JP); Atsuyoshi Yano, Tokyo (JP); Bunkei Matsuoka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 351 days.

(21) Appl. No.: 13/990,982

(22) PCT Filed: Mar. 29, 2012

(86) PCT No.: PCT/JP2012/002194
§ 371 (c)(1),
(2), (4) Date: May 31, 2013

(87) PCT Pub. No.: WO2012/153452
PCT Pub. Date: Nov. 15, 2012

(65) Prior Publication Data
US 2013/0251169 A1 Sep. 26, 2013

(30) Foreign Application Priority Data

May 10, 2011 (JP) ................................ 2011-105350

(51) Int. Cl.
*H04M 9/08* (2006.01)
*G10K 11/16* (2006.01)
*H04R 3/02* (2006.01)

(52) U.S. Cl.
CPC ............... *G10K 11/16* (2013.01); *H04M 9/082* (2013.01); *H04R 3/02* (2013.01)

(58) Field of Classification Search
CPC .............................. H04M 9/082; H04M 3/002
USPC ...................................... 379/406.05, 406.08
See application file for complete search history.

(56) References Cited

U.S. PATENT DOCUMENTS

| 6,198,819 B1* | 3/2001 | Farrell et al. ............. 379/406.08 |
| 2004/0057574 A1* | 3/2004 | Faller ........................ 379/387.01 |
| 2010/0086122 A1 | 4/2010 | Takada |

FOREIGN PATENT DOCUMENTS

| EP | 1 976 139 A1 | 10/2008 |
| EP | 1 803 288 B1 | 4/2010 |

(Continued)

OTHER PUBLICATIONS

Office Action issued Mar. 11, 2014 in German Patent Application No. 11 2012 001 201.1 (with English translation).

(Continued)

*Primary Examiner* — Alexander Jamal
(74) *Attorney, Agent, or Firm* — Oblon, McClelland, Maier & Neustadt, L.L.P.

(57) ABSTRACT

An echo canceler includes a signal-to-echo ratio calculating unit 103 and a residual echo suppressing unit 105. The signal-to-echo ratio calculating unit 103 computes a signal-to-echo ratio SE(n) indicating a ratio of an echo component to a received signal x(n) from a first residual signal and a second residual signal. The first residual signal is obtained using a filter coefficient sequence of an update filter 102, which is obtained up to the previous operation. The second residual signal is obtained using an updated filter coefficient sequence that undergoes a coefficient update which is performed, using an arbitrary update step size μ(n), on the filter coefficient sequence of the update filter 102, which is obtained up to the previous operation. The residual echo suppressing unit 105 suppresses the echo component contained in the microphone input signal in accordance with the signal-to-echo ratio the signal-to-echo ratio calculating unit 103 computes.

22 Claims, 6 Drawing Sheets

(56) References Cited

FOREIGN PATENT DOCUMENTS

| EP | 2 330 752 A1 | 6/2011 |
|---|---|---|
| JP | 2002 84212 | 3/2002 |
| JP | 2010 88039 | 4/2010 |
| WO | 2005 046076 | 5/2005 |
| WO | 2010 035308 | 4/2010 |

OTHER PUBLICATIONS

Yano, A., et al., "A Study on Residual Echo Suppression by Frequency Domain Processing," The Institute of Electronics, Information and Communication Engineers Sogo Taikai Koen Ronbunshu, p. 136, (Mar. 8, 2004).

ITU-T Recommendation, "Series G: Transmission Systems and Media, Digital Systems and Networks General Characteristics of international telephone connections and circuits—Apparatus associated with long-distance telephone circuits," ITU,Total 26 Pages, (Nov. 1988).

Sakauchi, S., et al., "Ambient Noise and Residual Echo Reduction Using Short-time Spectral Amplitude Estimation," vol. 50, No. 4, pp. 246-252, (2001).

Haykin, S., "Adaptive Filter Theory," Kagaku Gijutsu Shuppan, Inc., pp. 500-501, (Jan. 10, 2001).

International Search Report Issued May 22, 2012 in PCT/JP12/002194 Filed Mar. 29, 2012.

* cited by examiner

ECHO CANCELER AND ECHO DETECTOR

TECHNICAL FIELD

The present invention relates to a technique for detecting an echo of a received signal mixed into a send signal and for canceling the detected echo from the send signal.

BACKGROUND ART

An echo canceler is generally configured as a combination of a linear echo processing unit for canceling a linear echo component and a residual echo suppression processing unit for suppressing the linear echo component that cannot be canceled out by the linear echo processing and a nonlinear echo component. Such a configuration is disclosed in Non-Patent Document 1, for example. The echo canceler disclosed in the Non-Patent Document 1, however, has a problem in that when an echo and send voice overlap each other, that is, when double talk occurs, the residual echo suppression processing unit suppresses both the residual echo and send voice.

To solve the foregoing problem, Patent Document 1, for example, discloses a method of flexibly controlling suppression coefficients used for the amplitude suppression of a voice signal in the residual echo suppression processing unit. The Patent Document 1 discloses an echo suppression method for obtaining an echo suppression quantity using the power of an estimated echo signal obtained by multiplying the received signal power by the amount of acoustic coupling of an echo path, which is estimated from the power of a microphone input signal on which the send voice and echo signal are superposed.

PRIOR ART DOCUMENT

Patent Document

Patent Document 1: Japanese Patent Laid-Open No. 2002-84212.

Non-Patent Document

Non-Patent Document 1: ITU-T Recommendation G.165 (Sections 17-20).

DISCLOSURE OF THE INVENTION

Problems to be Solved

However, the foregoing conventional method that determines the echo suppression quantity from the power of the estimated echo signal calculated from the amount of acoustic coupling has two problems. First, when background noise is large, since an echo gets buried in the background noise, it cannot carry out right observation of the amount of acoustic coupling, which offers a problem of reducing the estimation accuracy of the echo signal power. Second, when the amount of acoustic coupling itself varies because of a change of an echo path, it becomes necessary to reobserve the amount of acoustic coupling, which offers a problem of being unable to suppress the echo appropriately until an appropriate echo suppression quantity can be obtained by calculating an accurate observed value. As a result, under the foregoing condition, the echo suppression quantity is not calculated correctly, which offers a problem of causing a residual echo or hindering telephone conversation because of excessive suppression of the send voice.

Thus, the foregoing conventional technique has the problems of bringing about the residual echo because of being unable to compute the appropriate echo suppression quantity or hindering the telephone conversation because of the excessive suppression of the send voice when carrying out the telephone conversation under the large noise or in an environment where the echo path varies.

The present invention is implemented to solve the foregoing problems. Therefore it is an object of the present invention to provide an echo canceler capable of calculating an appropriate echo suppression quantity even under the large noise or in the environment where the echo path varies.

Means for Solving the Problems

An echo canceler in accordance with the present invention comprises: a signal-to-echo ratio calculating unit for computing a signal-to-echo ratio indicating a ratio of the echo component to the received signal from a first residual signal and a second residual signal, the first residual signal being obtained by using a filter coefficient sequence of an update filter which is obtained up to the previous operation of the echo canceler, and the second residual signal being obtained by using an updated filter coefficient sequence that undergoes a coefficient update which is performed, using an arbitrary update step size, on the filter coefficient sequence of the update filter which is obtained up to the previous operation of the echo canceler; and an echo suppressing unit for suppressing the echo component contained in the microphone input signal in accordance with the signal-to-echo ratio the signal-to-echo ratio calculating unit computes.

Advantages of the Invention

According to the present invention, it can provide a suitable telephone conversation environment by suppressing the residual echo without hindering the telephone conversation due to the excessive suppression of the send voice even when telephone conversation is carried out in the condition where large noise occurs or the echo path changes.

BEST MODE FOR CARRYING OUT THE INVENTION

The best mode for carrying out the invention will now be described with reference to the accompanying drawings to explain the present invention in more detail.

Embodiment 1

Figure 1:
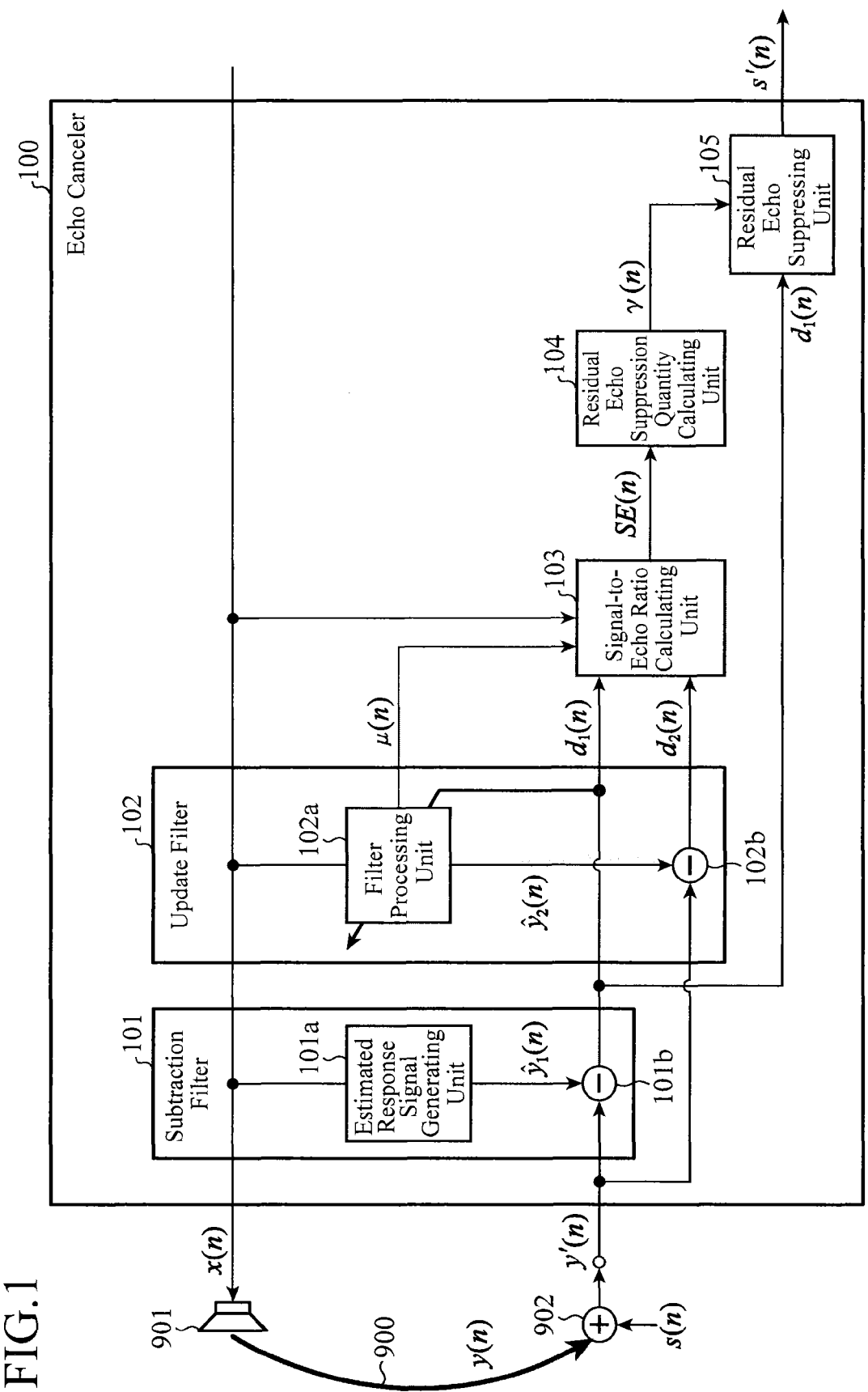
FIG. 1 is a block diagram showing a configuration of an echo canceler of an embodiment 1.

FIG. 1 is a block diagram showing a configuration of an echo canceler of an embodiment 1. In FIG. 1, the echo canceler 100 comprises a subtraction filter 101 for generating a first estimated echo signal and a first residual signal; an update filter 102 for carrying out a coefficient update of a filter coefficient sequence and for generating a second estimated echo signal and a second residual signal using the updated filter coefficient sequence; a signal-to-echo ratio calculating unit 103 for computing a signal-to-echo ratio; a residual echo suppression quantity calculating unit 104 for calculating the suppression quantity of a residual echo; and a residual echo suppressing unit 105 for suppressing the residual echo. Furthermore, the subtraction filter 101 comprises an estimated response signal generating unit 101a and a subtractor 101b, and the update filter 102 comprises a filter processing unit 102a and a subtractor 102b.

In addition, as shown in FIG. 1, the echo canceler 100 is connected to a speaker 901 for outputting the received signal x(n) in voice and a microphone 902 for picking up surrounding voice. When the received signal x(n) is output from the speaker 901 as voice, it incorporates, during propagation through an echo path 900, its transfer characteristics to form an echo signal y(n) which is input to the microphone 902. Furthermore, the microphone 902 is supplied with a near-end signal s(n) which is the sum of a send voice signal and a background noise signal and forms a microphone input signal y'(n) with the echo signal y(n). Thus, the microphone input signal y'(n) is given by the following Expression (1).

$$y'(n)=y(n)+s(n) \tag{1}$$

Receiving the received signal x(n) and the microphone input signal y'(n), the echo canceler 100 cancels the echo signal y(n) contained in the microphone input signal y'(n), and outputs an output signal s'(n) which is an estimated signal of the near-end signal s(n).

Next the operation of the echo canceler 100 of the embodiment 1 will be described.

Assume that the subtraction filter 101 has a filter coefficient sequence $\hat{h}(n)=[\hat{h}_0(n), \hat{h}_1(n), \ldots, \hat{h}_{N-1}(n)]^T$, where N is a filter length. It generates a first estimated echo signal $\hat{y}_1(n)$ by filter processing using the received signal x(n), and obtains a first residual signal $d_1(n)$ by subtracting the signal $\hat{y}_1(n)$ from the microphone signal y'(n). Assuming that a residual echo signal, which is obtained by subtracting the estimated echo signal $\hat{y}_1(n)$ from the echo signal y(n), is e(n) (that is, $e(n)=y(n)-\hat{y}_1(n)$), the first residual signal $d_1(n)$ is given by the following Expression (2).

$$d_1(n)=y(n)-\hat{y}_1(n)=y(n)+s(n)-y_1(n)=e(n)+s(n) \tag{2}$$

It is assumed here that at the initial point where n=0, the filter coefficient sequence $\hat{h}(0)$ is set at a particular initial value. Incidentally, as for the filter coefficient sequence $\hat{h}(n)$, it is stored in a memory unit (not shown) and is acquired from the memory unit.

In addition, according to a prescribed adaptive algorithm, the update filter 102 executes coefficient update processing using the received signal x(n), the first residual signal $d_1(n)$ and an update step size μ(n) determined arbitrarily, and obtains the updated filter coefficient sequence $\hat{h}(n+1)$ by the following Expression (3)

$$\hat{h}(n+1)=\hat{h}(n)+\mu(n)\epsilon(n) \tag{3}$$

where ϵ(n) is a coefficient adjusting value obtained by the coefficient update processing, which is determined by the adaptive algorithm. Incidentally, the update step size μ(n) can be a fixed value or a value varied each time by a prescribed means.

In addition, the update filter 102 generates a second estimated echo signal $\hat{y}_2(n)$ by the filter processing of the received signal x(n) using the updated filter coefficient sequence $\hat{h}(n+1)$ obtained by the coefficient update processing of the foregoing Expression (3). In addition, it obtains a second residual signal $d_2(n)$ by subtracting the second estimated echo signal $\hat{y}_2(n)$ from the microphone input signal y'(n). The signal-to-echo ratio calculating unit 103 outputs a signal-to-echo ratio SE(n) from the received signal x(n), the first residual signal $d_1(n)$, the second residual signal $d_2(n)$ and the update step size μ(n) used in the update filter 102. Incidentally, a calculating method of the signal-to-echo ratio SE(n) will be described in detail later.

The residual echo suppression quantity calculating unit 104 computes a residual echo suppression quantity γ(n) by using the signal-to-echo ratio SE(n) generated by the signal-to-echo ratio calculating unit 103. For example, it can compute it by the following Expression (4).

$$\gamma(n) = 1 - \frac{\sigma_e^2}{\sigma_{d_1}^2} = 1 - \frac{1}{SE(n)} \tag{4}$$

As for another method for calculating the residual echo quantity γ(n) using the signal-to-echo ratio SE(n), the following reference describes it, for example.

Reference 1: Sumitaka SAKAUCHI et al., "Ambient Noise and Residual Echo Reduction Using Short-time Spectral Amplitude Estimation", NTT R&D, vol. 50, no. 4, pp. 246-252, (2001).

As shown in the following Expression (5), the residual echo suppressing unit 105 carries out suppression processing by multiplying the first residual signal by the residual echo suppression quantity γ(n) generated by the residual echo suppression quantity calculating unit 104, thereby obtaining the estimated signal s'(n) of the near-end signal s(n).

$$s'(n)=\gamma(n)*d_1(n) \tag{5}$$

The above is the description of the operation of the echo canceler 100 of the embodiment 1.

Next, a computing method of the signal-to-echo ratio SE(n) by the signal-to-echo ratio calculating unit 103 will be described in detail. Incidentally, assuming that the variance of the residual signal d(n) and the variance of the residual echo signal e(n) are defined as $\sigma_d^2$ and $\sigma_e^2$, the signal-to-echo ratio SE(n) is defined by the following Expression (6).

$$SE(n) = \frac{\sigma_d^2}{\sigma_e^2} \tag{6}$$

Here, since the residual echo signal e(n) cannot be directly observed in general, the signal-to-echo ratio SE(n) cannot be calculated by the foregoing Expression (6). However, using the echo canceler 100 of the embodiment 1 makes it possible to obtain the signal-to-echo ratio SE(n) accurately using the observable residual signal and the update step size μ used by the update filter 102. To clarify the basis of the computing method of the signal-to-echo ratio SE(n), a deriving process of the computing method will be described in detail.

Assuming that the transfer function of the echo path 900 is given by $h=[h_0, h_1, \ldots, h_{N-1}]^T$, and consider a case of estimating the transfer function by the update filter 102. Here, an identification error δ(n) between the transfer function of the echo path 900 and the estimated transfer function by the update filter 102 is defined by the following Expression (7).

$$\delta(n)=\hat{h}(n)-h \tag{7}$$

Supposing that the coefficient update processing is advanced one step according to the foregoing Expression (3), then the identification error δ(n+1) is given by the following Expression (8)

$$\delta(n+1) = \hat{h}(n+1) - h \qquad (8)$$
$$= \delta(n) + \mu\varepsilon(n)$$

When expressing the magnitude of the identification error by the sum of squared errors of the individual taps of the filter coefficients, the difference between the identification errors in one step of the coefficient update processing is given by the following Expression (9).

$$\Delta(n+1) = \delta^T(n+1)\delta(n+1) - \delta^T(n)\delta(n) \qquad (9)$$
$$= \mu^2 \varepsilon^T(n)\varepsilon(n) + 2\mu\delta^T(n)\varepsilon(n)$$

The following description will be made by way of example that uses the NLMS (Normalized Least Mean Square) algorithm. However, the present invention is not limited to the NLMS but can use other adaptive algorithms, and it is assumed that cases using other adaptive algorithms are contained in the present invention.

In the NLMS algorithm, the coefficient update processing corresponding to the foregoing Expression (3) is given by the following Expression (10).

$$\hat{h}(n+1) = h(n) + \mu \frac{x(n)}{N\sigma_x^2} d(n) \qquad (10)$$

Incidentally, in the foregoing Expression (10), $x(n)=[x(n)\ x(n-1)\ \ldots,\ x(n-N+1)]^T$ is a received signal sequence, $\sigma_x^2$ is the variance of the received signal and $d(n)$ is the residual signal. In the real calculation, however, it is often placed as $N\sigma_x^2 \approx x^T(n)x(n)$ approximately, which is the signal power of the received signal sequence.

In addition, when using the NLMS algorithm, the foregoing Expression (9) is rewritten into the following Expression (11).

$$\Delta(n+1) = \mu^2 \frac{d^2(n)}{(N\sigma_x^2)^2} x^T(n)x(n) + 2\mu \frac{d(n)}{N\sigma_x^2}\delta^T(n)x(n) \qquad (11)$$
$$= \mu^2 \frac{d^2(n)}{(N\sigma_x^2)^2} x^T(n)x(n) - 2\mu \frac{(e(n)+s(n))e(n)}{N\sigma_x^2}$$

In the foregoing Expression (11), the fact is applied that the residual echo signal $e(n)$ is given from the identification error $\delta(n)$ and the received signal $x(n)$ by the following Expression (12).

$$e(n) = -\delta^T(n)x(n) \qquad (12)$$

Furthermore, considering the fact that the received signal $x(n)$ and the near-end signal $s(n)$ are generally uncorrelated and independent, the expected value of Expression (11) can be approximated as the following Expression (13).

$$E[\Delta(n+1)] \approx \mu^2 \frac{\sigma_d^2}{N\sigma_x^2} - 2\mu \frac{\sigma_e^2}{N\sigma_x^2} \qquad (13)$$

Assume that one-time coefficient update processing is executed using an arbitrary update step size μ. The difference between the variances of the residual signal due to the filter coefficients before and after the coefficient update processing can be approximated by the product of the difference Δ(n+1) of the sum of squared identification errors and the power $N\sigma_x^2$ of the received signal sequence $x(n)$, and is given by the following Expression (14).

$$\sigma_{d'}^2(\mu) - \sigma_d^2 = E[\Delta(n+1)] * N\sigma_x^2 \qquad (14)$$
$$= \mu^2 \sigma_d^2 - 2\mu\sigma_e^2$$

where $\sigma_{d'}^2(\mu)$ is the variance of the residual signal due to the filter coefficients after the coefficient update processing using the update step size μ. Assume that the coefficient update processing is executed separately using different update step sizes $\mu_1$ and $\mu_2$, and that the variances of the residual signals are $\sigma_{d'}^2(\mu_1)$ and $\sigma_{d'}^2(\mu_2)$, respectively, then the difference between the two is given by the following Expression (15).

$$\sigma_{d'}^2(\mu_1) - \sigma_{d'}^2(\mu_2) = (\mu_1^2 - \mu_2^2)\sigma_d^2(\mu) - 2(\mu_1 - \mu_2)\sigma_e^2 \qquad (15)$$

Transforming Expression (15) further gives the following Expression (16).

$$\frac{\sigma_e^2}{\sigma_d^2} = \frac{1}{2}(\mu_1 + \mu_2) - \frac{1}{2}\frac{1}{(\mu_1 - \mu_2)}\frac{\sigma_{d'}^2(\mu_1) - \sigma_{d'}^2(\mu_2)}{\sigma_d^2} \qquad (16)$$

In Expression (16), the left side is the reciprocal of the signal-to-echo ratio. Furthermore, Expression (16) can be further simplified by placing $\mu_1$ or $\mu_2$ at zero, which is given by the following Expression (17).

$$\frac{\sigma_e^2}{\sigma_d^2} = \frac{1}{2}\mu - \frac{1}{2\mu}\frac{\sigma_{d'}^2(\mu) - \sigma_d^2}{\sigma_d^2} \qquad (17)$$

Expression (17) shows that the reciprocal of the signal-to-echo ratio can be calculated by observing the variance $\delta_d^2(\mu)$ of the residual signal due to the filter coefficient sequence at the previous step of executing the coefficient update processing and the variance $\sigma_{d'}^2(\mu)$ of the residual signal due to the filter coefficients obtained by the coefficient update processing based on the arbitrary update step size μ.

Accordingly, the signal-to-echo ratio calculating unit 103 of the present invention calculates the signal-to-echo ratio given by the following Expression (18) from the first residual signal $d_1(n)$, second residual signal $d_2(n)$ and the update step size.

$$SE(n) = \left(\frac{1}{2}\mu(n) - \frac{1}{2\mu(n)}\frac{\sigma_{d_2}^2(n) - \sigma_{d_1}^2(n)}{\sigma_{d_1}^2(n)}\right)^{-1} \qquad (18)$$

where $\sigma_{d_1}^2(n)$ is the variance of the first residual signal $d_1(n)$ and $\sigma_{d_2}^2(n)$ is the variance of the second residual signal $d_2(n)$. The values of the variances can be measured approximately in terms of the average power of the signal or the leak integral value of the square of the amplitude of the signal. The average power $P_{avg}(n)$ and the leak integral $l(n)$ are given by the following Expression (19).

$$P_{avg}(n) = \frac{1}{L}\sum_{i=0}^{L-1} d^2(n-1)$$

$$l(n) = (1-\alpha)l(n-1) + \alpha d^2(n)$$

(19)

where $\alpha$ is a forgetting factor which satisfies $0<\alpha<1$.

Incidentally, assuming that the update step size $\mu(n)$ is one for all the time n, Expression (18) is reduced as the following Expression (20).

$$SE(n) = \left(1 - \frac{1}{2}\frac{\sigma_{d_2}^2(n)}{\sigma_{d_1}^2(n)}\right)^{-1}$$

(20)

These are the details of the computing method of the signal-to-echo ratio SE(n).

As described above, the echo canceler 100 of the present invention is characterized by making it possible to calculate the signal-to-echo ratio SE(n) only from directly observable statistics without using the acoustic coupling quantity or other estimated values. More specifically, it can observe the variance $\sigma_{d_1}^2(n)$ of the first residual signal and the variance $\sigma_{d_2}^2(n)$ of the second residual signal used in the calculation equation of the signal-to-echo ratio given by the foregoing Expression (18) without depending on the noise conditions or the degree of stability of the echo.

This means that applying the present invention always enables computing the signal-to-echo ratio SE(n) accurately without depending on the noise conditions or the degree of the stability of the echo, and the configuration that controls the suppression quantity of the residual echo in accordance with the signal-to-echo ratio SE(n) thus computed can achieve a residual echo suppression effect more stably than the conventional technique. As a result, the echo canceler can calculate an accurate signal-to-echo ratio without being interfered by external factors even in such conditions as large noise or echo path variations can occur, thereby being able to determine the appropriate echo suppression quantity and to suppress the residual echo always stably without deteriorating the send voice.

Figure 2:
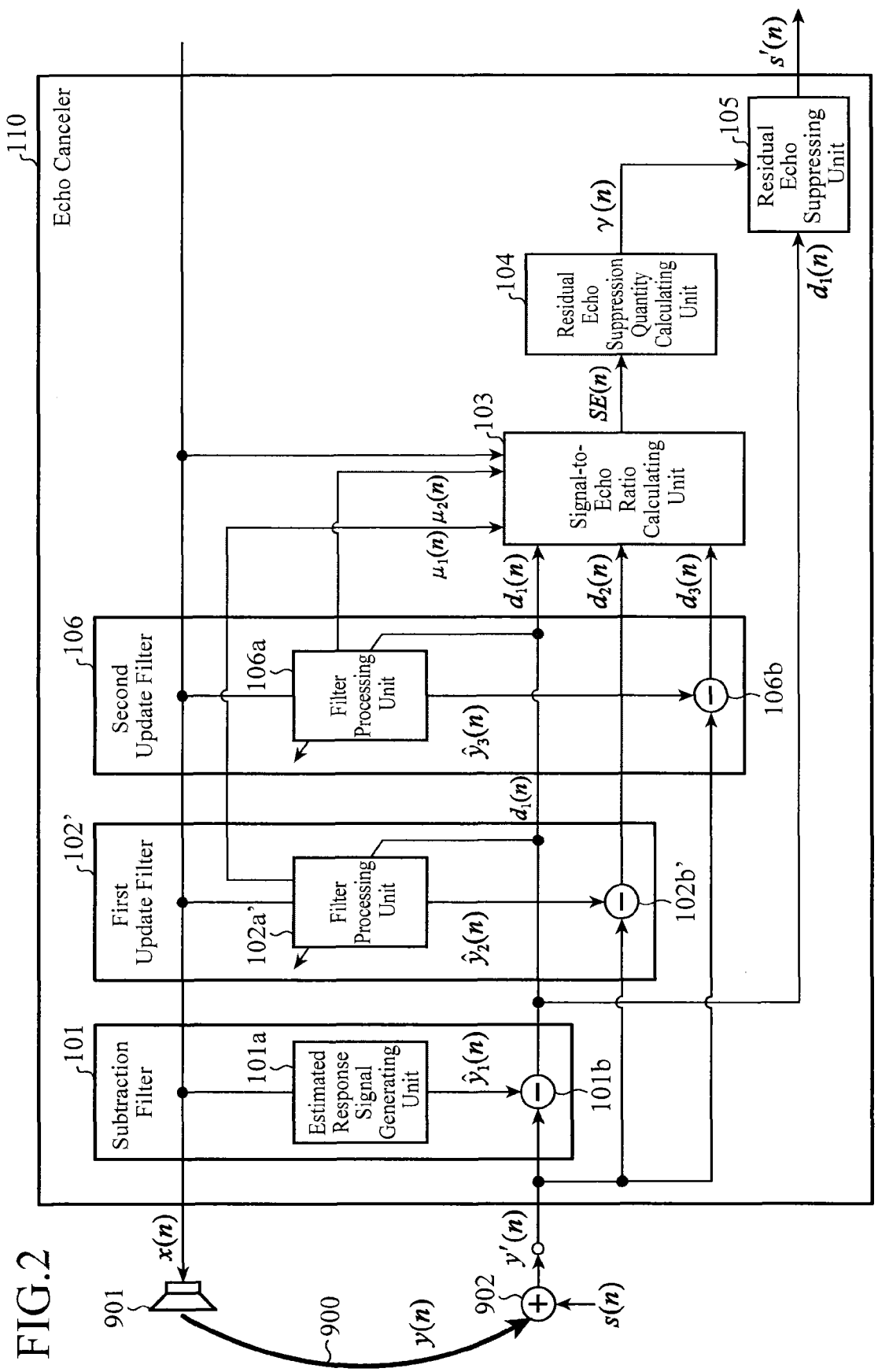
FIG. 2 is a block diagram showing another configuration of the echo canceler of the embodiment 1.

Next, another configuration of the echo canceler 100 will be shown. FIG. 2 is a block diagram showing another configuration of the echo canceler of the embodiment 1. The echo canceler 110 of FIG. 2 comprises a second update filter 106 in addition to the echo canceler 100 shown in FIG. 1. Incidentally, in FIG. 2, the same components as those of the echo canceler 100 shown in FIG. 1 are designated by the same reference numerals and their description will be omitted.

A first update filter 102' comprises a filter processing unit 102a' and a subtractor 102b', and the second update filter 106 comprises a filter processing unit 106a and a subtractor 106b. The first update filter 102' and the second update filter 106 operate in the same manner as the foregoing first update filter 102. It is assumed here that the first update filter 102' uses the first update step size $\mu_1(n)$ and the second update filter 106 uses the second update step size $\mu_2(n)$.

By adding the second update filter 106, the signal-to-echo ratio calculating unit 103 is supplied with three residual signals, that is, the first residual signal $d_1(n)$ from the subtraction filter 101, the second residual signal $d_2(n)$ from the first update filter 102' and a third residual signal $d_3(n)$ from the third update filter 106.

The signal-to-echo ratio calculating unit 103 obtains the signal-to-echo ratio SE(n) from two residual signals $d_A(n)$ and $d_B(n)$ among the three residual signals of the first residual signal $d_1(n)$, second residual signal $d_2(n)$ and third residual signal $d_3(n)$, and from two parameters $\mu_A$ and $\mu_B$ among the three different parameters of the first update step size $\mu_1(n)$, second update step size $\mu_2(n)$ and "zero" according to the following Expression (21).

$$SE(n) = \left(\frac{1}{2}(\mu_A + \mu_B) - \frac{1}{2(\mu_A - \mu_B)}\frac{P(d_A(n)) - P(d_B(n))}{P(d_1(n))}\right)^{-1}$$

(21)

The following are concrete combinations of the two residual signals $d_A(n)$ and $d_B(n)$ and two parameters $\mu_A$ and $\mu_B$ in Expression (21).

Pattern 1:
$d_A(n)=d_2(n)$, $d_B(n)=d_1(n)$, $\mu_A=\mu_1(n)$, $\mu_B=0$.
Pattern 2:
$d_A(n)=d_3(n)$, $d_B(n)=d_2(n)$, $\mu_A=\mu_2(n)$, $\mu_B=\mu_1(n)$.
Pattern 3:
$d_A(n)=d_3(n)$, $d_B(n)=d_1(n)$, $\mu_A=\mu_2(n)$, $\mu_B=0$.

The signal-to-echo ratio calculating unit 103 can select one of the signal-to-echo ratio $SE_1(n)$ computed using the pattern 1, the signal-to-echo ratio $SE_2(n)$ computed using the pattern 2 and the signal-to-echo ratio $SE_3(n)$ computed using the pattern 3 as the final signal-to-echo ratio SE(n). Alternatively, it can compute the average value of the three signal-to-echo ratios computed and make it a final signal-to-echo ratio SE(n). The residual echo suppression quantity calculating unit 104, using the foregoing Expression (4), for example, computes the residual echo suppression quantity $\gamma(n)$ from the signal-to-echo ratio SE(n) obtained by the signal-to-echo ratio calculating unit 103. The residual echo suppressing unit 105 executes the suppression processing by multiplying the first residual signal $d_1(n)$ by the residual echo suppression quantity $\gamma(n)$ according to the foregoing Expression (5), thereby obtaining the estimated signal s'(n) of the near-end signal s(n).

Thus, the present embodiment can obtain a highly accurate signal-to-echo ratio SE(n) by comprising the signal-to-echo ratio calculating unit 103 for computing the signal-to-echo ratio SE(n) using the plurality of residual signals supplied from the plurality of update filters.

Incidentally, although FIG. 2 shows the configuration which comprises the additional second update filter 106, and supplies the first residual signal $d_1(n)$, second residual signal $d_2(n)$ and third residual signal $d_3(n)$ to the signal-to-echo ratio calculating unit 103, the number of update filters to be added and the number of the residual signals d to be supplied to the signal-to-echo ratio calculating unit 103 can be altered appropriately.

Although the description thus far is made by way of example of the NLMS algorithm, deriving examples of the signal-to-echo ratio SE(n) using the LMS algorithm and affine projection algorithm as the adaptive algorithm in the echo canceler in accordance with the present invention will be described below.

LMS Algorithm
(Update Expression of Filter Coefficients)

$$\hat{h}(n+1) = \hat{h}(n) + \mu(n)d(n)x(n)$$

(22)

(Signal-to-Echo Ratio Calculating Expression)

$$SE(n) = \left\{ \frac{1}{2}\mu(n) - \frac{1}{2}\frac{1}{\mu(n)}\frac{1}{(N\sigma_x^2)^2}\left(\frac{\sigma_{d_2}^2(n) - \sigma_{d_1}^2(n)}{\sigma_{d_1}^2(n)}\right) \right\}^{-1} \quad (23)$$

Affine Projection Algorithm
(Update Expression of Filter Coefficients)

$$\hat{h}(n+1) = \hat{h}(n) + \mu(n)X_p(n)[X_p^T(n)X_p(n)]^{-1}d_p(n) \quad (24)$$

(Signal-to-Echo Ratio Calculating Expression $$SE(n) = \left\{ \frac{1}{2}\mu(n) - \frac{1}{2}\frac{1}{\mu(n)}\frac{1}{N\sigma_x^2}\frac{\sigma_{d_2}^2(n) - \sigma_{d_1}^2(n)}{d_p^T(n)(X_p^T(n)X_p(n))^{-1}d_p(n)} \right\}^{-1} \quad (25)$$

where p is the order of projection, and $$X_p(n) = [x(n), x(n-1), \ldots, x(n-p+1)]^T$$

$$d_p(n) = [d_1(n), d_1(n-1), \ldots, d_1(n-p+1)]^T \quad (26)$$

The examples of the foregoing Expressions (22) and (24) can be derived in the same process as the example of the NLMS. As clear from Expressions (22) and (24), to use the LMS algorithm or affine projection algorithm, the signal-to-echo ratio calculating unit 103 also requires the received signal x(n) as information for calculating the signal-to-echo ratio SE(n).

In addition, an echo canceler in accordance with the present invention can be configured by using a block adaptive filter algorithm such as the BLMS (Block LMS) or BOP (Block Orthogonal Projection Algorithm), which executes the LMS algorithm or affine projection algorithm in prescribed signal block units. Using these block adaptive filter algorithms, it becomes possible to observe a prescribed block length signal as to the first residual signal $d_1(n)$ and second residual signal $d_2(n)$. This will improve the accuracy of observations of their variances and power, thereby being able to obtain a more accurate signal-to-echo ratio.

As described above, according to the present embodiment 1, it is configured in such a manner as to comprise the signal-to-echo ratio calculating unit 103 for calculating the signal-to-echo ratio SE(n) from the received signal x(n), the first residual signal $d_1(n)$ obtained by the subtraction filter 101, and the second residual signal $d_2(n)$ obtained by the update filter 102, in accordance with the filter update step size (n) used by the update filter 102. Accordingly, it can calculate the signal-to-echo ratio only from directly observable statistics without using the amount of acoustic coupling or other estimates, thereby being able to calculate an accurate signal-to-echo ratio even in the conditions where large noise or echo path variation occurs. This makes it possible to suppress the residual echo always stably without deteriorating the send voice.

In addition, according to the present embodiment 1, it is configured in such a manner as to comprise the signal-to-echo ratio calculating unit 103 for calculating the signal-to-echo ratio SE(n) using the received signal x(n), the first residual signal $d_1(n)$ obtained by the subtraction filter 101, the second residual signal $d_2(n)$ and the first update step size (n) supplied from the first update filter 102', and the third residual signal $d_3(n)$ and the second update step size $\mu_2(n)$ supplied from the second update filter 106. Accordingly, it can obtain the highly accurate signal-to-echo ratio SE(n).

Embodiment 2

Figure 3:
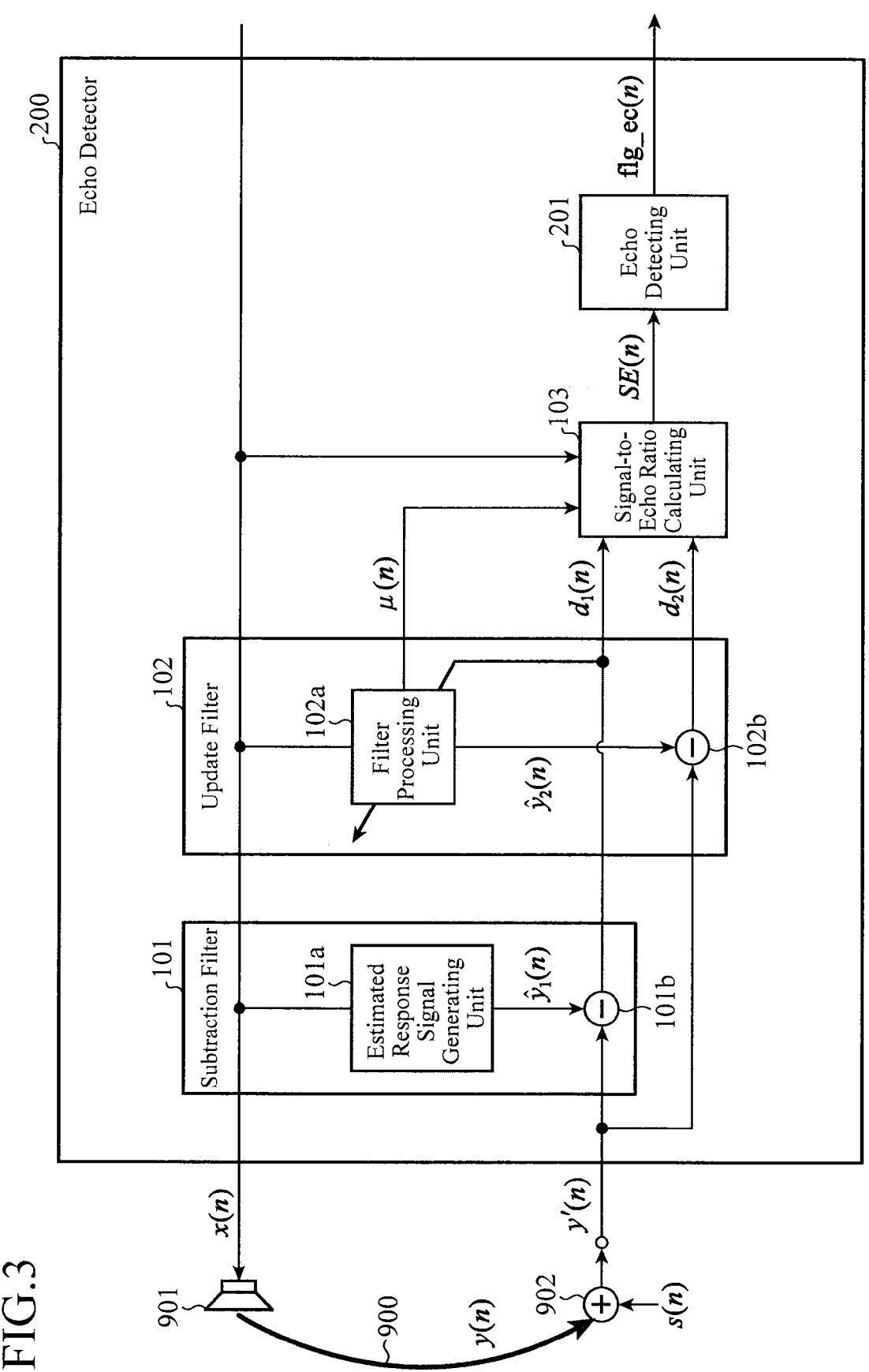
FIG. 3 is a block diagram showing a configuration of an echo canceler of an embodiment 2.

An echo detector comprising the subtraction filter 101, update filter 102 and signal-to-echo ratio calculating unit 103 shown in the foregoing embodiment 1 will be described. FIG. 3 is a block diagram showing a configuration of an echo detector of an embodiment 2.

In FIG. 3, the echo detector 200 comprises an echo detecting unit 201 instead of the residual echo suppression quantity calculating unit 104 and the residual echo suppressing unit 105 of the echo canceler 100 shown in the embodiment 1. Incidentally, in FIG. 3, the same components as those of the echo canceler 100 shown in FIG. 1 of the embodiment 1 are designated by the same reference numerals and their description will be omitted.

The signal-to-echo ratio calculating unit 103 calculates, according to the foregoing Expression (18), the signal-to-echo ratio SE(n) using the received signal x(n), the first residual signal $d_1(n)$ obtained by the subtraction filter 101, the second residual signal $d_2(n)$ obtained by the update filter 102 and the filter update step size $\mu(n)$ used by the update filter 102.

The echo detecting unit 201 decides on whether the residual echo quantity is not less than a threshold with respect to the send voice signal or not using the signal-to-echo ratio SE(n) the signal-to-echo ratio calculating unit 103 computes, and outputs the decision result as an echo detection result. As the output of the echo detection result, it uses a flag flg_ec(n). When it decides that the residual echo quantity is less than the threshold with respect to the send voice signal, it decides that the echo is undetected and outputs the flag flg_ec(n)=0. In contrast, when it decides that the residual echo quantity is not less than the threshold with respect to the send voice signal, it decides that the echo is detected and outputs the flag flg_ec(n)=1.

As a concrete example using the echo detector 200, voice code transmission control of a mobile phone can be mentioned. For example, when double talk in which echo is superposed on a send volume occurs during a telephone conversation of a mobile phone, the signal-to-echo ratio calculating unit 103 computes the signal-to-echo ratio SE(n) of the residual signal after subtracting the estimated echo through the adaptive filter according to the foregoing Expression (18), and the echo detecting unit 201 detects an echo from the signal-to-echo ratio SE(n) computed. When the echo detecting unit 201 detects the echo, the voice code transmission control (not shown) thereafter transmits a code indicating a pause without transmitting a code of voice.

As described above, according to the present embodiment 2, it is configured such a manner as to comprise the signal-to-echo ratio calculating unit 103 for computing the signal-to-echo ratio SE(n) of the residual signal after subtracting the estimated echo through the adaptive filter, and the echo detecting unit 201 for deciding on whether the residual echo quantity is not less than the threshold with respect to the send voice signal in accordance with the signal-to-echo ratio SE(n) computed. Accordingly, it can detect the presence or absence of the echo accurately even if the echo path varies.

In addition, according to the present embodiment 2, it is configured in such a manner as to execute, in the voice code transmission control using the echo detector 200, the voice code transmission control in accordance with the detection result of the echo detecting unit 201. Accordingly, when an echo is detected, it transmits a code indicating a pause without sending a code of voice, thereby being able to provide a leeway for a circuit capacity and to prevent a far-end user of the telephone conversation from hearing the echo and from feeling displeasure.

Embodiment 3

The foregoing embodiment 1 shows a configuration which causes the update filter 102 to update the updated filter coefficient sequence using the received signal x(n) and the microphone input signal y'(n), and to obtain the second residual signal $d_2(n)$ soon after that using the same received signal x(n) and microphone input signal y'(n), and which uses them for computing the signal-to-echo ratio SE(n).

However, although the received signal x(n) and the near-end signal s(n) are uncorrelated in general, correlation sometimes appear between the received signal x(n) and the near-end signal s(n) and hence there are some cases where the update filter coefficient $\hat{h}(n+1)$ outputs the second estimated echo signal $\hat{y}_2(n)$ that will eliminate part of the near-end signal s(n) in the microphone input signal y'(n) supplied. In this case, there are some cases where the variance $\sigma_{d_2}^2(n)$ of the second residual signal $d_2(n)$ is reduced temporarily, which can sometimes hinder accurate calculation of the signal-to-echo ratio. Thus, the present embodiment 3 shows a configuration which obtains the residual signal for the received signal x(n) and the microphone input signal y'(n) after carrying out the coefficient update processing, thereby maintaining the calculation accuracy of the signal-to-echo ratio.

Figure 4:
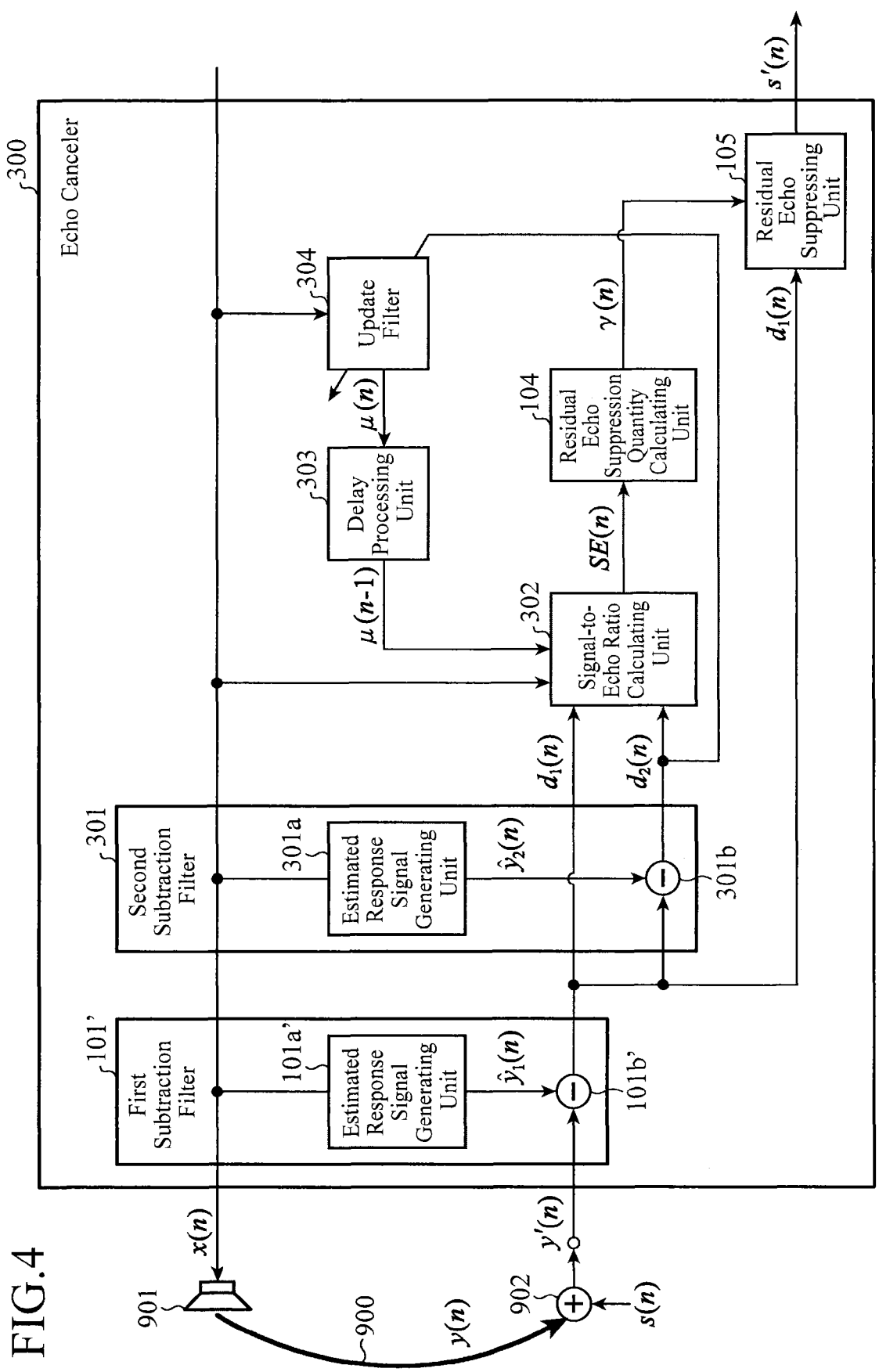
FIG. 4 is a block diagram showing a configuration of an echo canceler of an embodiment 3.

FIG. 4 is a block diagram showing a configuration of an echo canceler of the embodiment 3. In FIG. 4, the echo canceler 300 comprises a first subtraction filter 101' for generating a first estimated response signal and a first residual signal, a second subtraction filter 301 for generating a second estimated response signal and a second residual signal, a signal-to-echo ratio calculating unit 302 for calculating a signal-to-echo ratio, a residual echo suppression quantity calculating unit 104 for calculating the suppression quantity of the residual echo, a residual echo suppressing unit 105 for suppressing the residual echo, a delay processing unit 303 for providing an update step size obtained in the previous operation, and an update filter 304 for executing coefficient update of the filter coefficient sequence.

Furthermore, the first subtraction filter 101' comprises an estimated response signal generating unit 101a' and a subtractor 101b', and the second subtraction filter 301 comprises an estimated response signal generating unit 301a and a subtractor 301b, Incidentally, in FIG. 4, the same components as those of the echo canceler 100 shown in FIG. 1 are designated by the same reference numerals and their description will be omitted.

Next, the operation of the echo canceler 300 of the present embodiment 3 will be described.

The first subtraction filter 101' generates the first estimated echo signal $\hat{y}_1(n)$ through the filter processing using the filter coefficient sequence $\hat{h}(n-1)$ obtained as a result up to the operation before the last operation, and obtains the first residual signal $d_1(n)$ by subtracting the signal $\hat{y}_1(n)$ from the microphone input signal y'(n). Likewise, the second subtraction filter 301 generates the second estimated echo signal $\hat{y}_2(n)$ through the filter processing using the updated filter coefficient sequence $\hat{h}(n)$ obtained in the previous operation, and obtains the second residual signal $d_2(n)$ by subtracting the signal $\hat{y}_2(n)$ from the microphone input signal y'(n).

The signal-to-echo ratio calculating unit 302 calculates the signal-to-echo ratio SE(n) using the first residual signal $d_1(n)$, second residual signal $d_2(n)$ and the update step size $\mu(n-1)$ which is used previously and is input from the delay processing unit 303. The computing method is the same as that of the embodiment 1. In addition, when using the LMS algorithm, affine projection algorithm or the like as the adaptive algorithm as described in the embodiment 1, the received signal x(n) is also used. The delay processing unit 303 temporarily stores the update step size $\mu(n)$ the update filter 304 uses for the coefficient update, and supplies it to the signal-to-echo ratio calculating unit 302 at the point of time when computing the next signal-to-echo ratio SE(n).

Using the signal-to-echo ratio SE(n) generated by the signal-to-echo ratio calculating unit 302, the residual echo suppression quantity calculating unit 104 computes the residual echo suppression quantity γ(n) using the foregoing Expression (4), for example. Furthermore, the residual echo suppressing unit 105 produces the output signal s'(n) by multiplying the first residual signal $d_1(n)$ by the residual echo suppression quantity γ(n) generated by the residual echo suppression quantity calculating unit 104 using the foregoing Expression (5).

The update filter 304 updates the filter coefficient sequence $\hat{h}(n)$ using the received signal x(n), the second residual signal $d_2(n)$ and the update step size $\mu(n)$ determined arbitrarily, and obtains the filter coefficient sequence $\hat{h}(n+1)$ updated according to the following Expression (27).

$$\hat{h}(n+1)=\hat{h}(n)+\mu(n)e(n) \quad (27)$$

It is assumed here that the update is not carried out at the initial point where n=0 because of the lack of the coefficient update quantity, and that the filter coefficient sequence $\hat{h}(1)$ maintains the initial value $\hat{h}(0)$. The filter coefficient $\hat{h}(n+1)$ updated by the update filter 304 is used as the filter coefficient of the second subtraction filter 301 at the next time sequence n+1.

As described above, according to the present embodiment 3, it is configured in such a manner as to comprise the update filter 304 for updating the filter coefficient sequence, the second subtraction filter 301 for obtaining the second residual signal $d_2(n)$ from the received signal x(n) and the microphone input signal y'(n) which are supplied after the update of the filter coefficient sequence, and the signal-to-echo ratio calculating unit 302 for calculating the signal-to-echo ratio SE(n) using the second residual signal $d_2(n)$. Accordingly, it can prevent the variance $\sigma_{d_2}^2(n)$ of the second residual signal $d_2(n)$ from appearing to be smaller because of the correlation between the received signal and the near-end signal, thereby being able to calculate the signal-to-echo ratio SE(n) accurately and to suppress the residual echo appropriately.

Incidentally, although the foregoing embodiment 3 shows the configuration that uses the update step size $\mu(n-1)$ obtained in the previous operation, it is not limited to the coefficient update quantity obtained in the previous operation, but can be altered appropriately. For example, a configuration is also possible which uses the update step size $\mu(n-2)$ obtained in the operation before the last operation.

Embodiment 4

When a near-end signal generation condition or a convergence state of the update filter differs from frequency band to frequency band, applying the present invention to an adaptive algorithm using time-frequency conversion such as a high speed LMS so as to calculate the signal-to-echo ratio and execute the residual echo suppression processing for each frequency band makes it possible to expect to achieve more efficient echo canceling. Thus, the present embodiment 4 describes a configuration that employs the adaptive algorithm using the time-frequency conversion.

Figure 5:
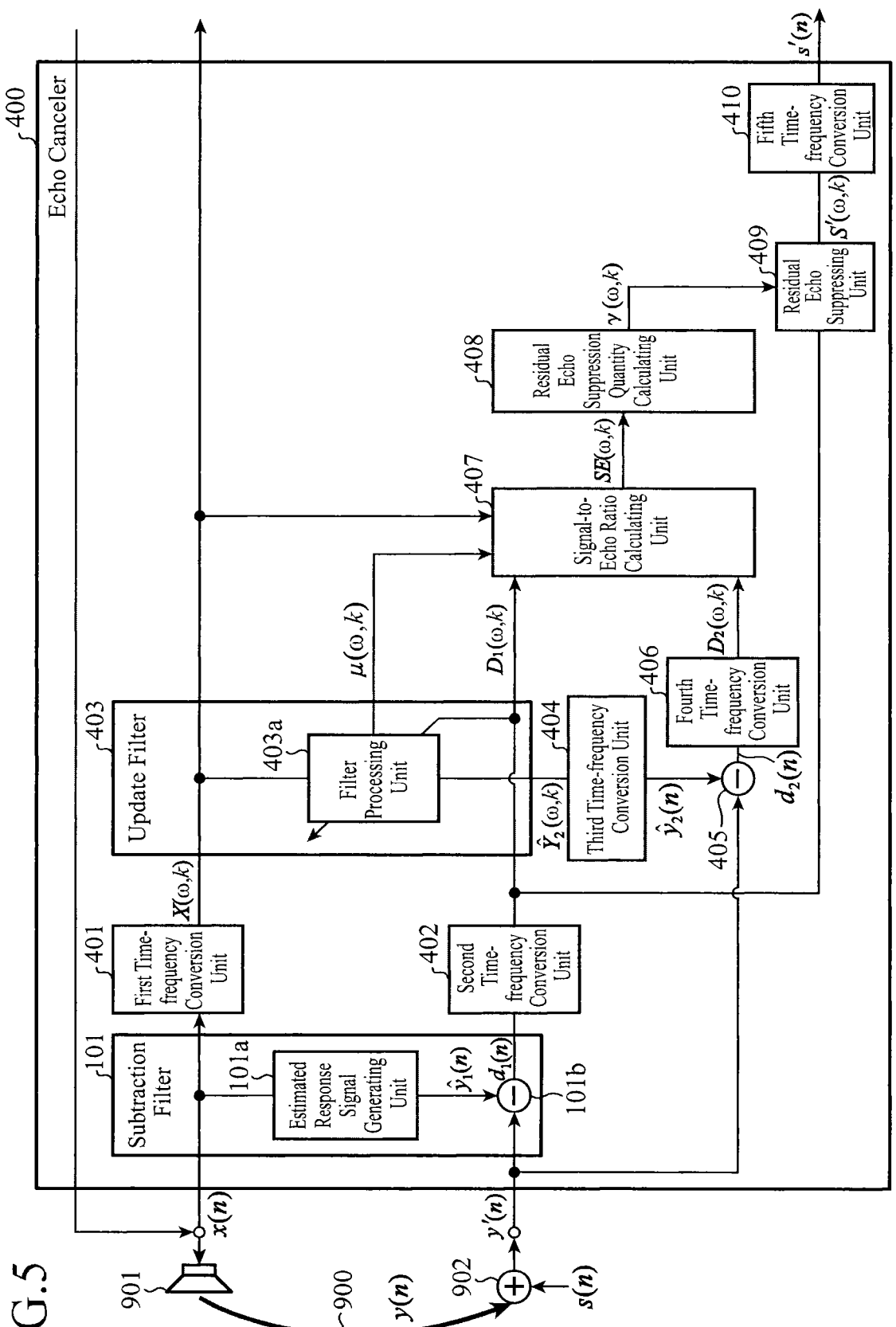
FIG. 5 is a block diagram showing a configuration of an echo canceler of an embodiment 4.

FIG. 5 is a block diagram showing a configuration of an echo canceler of an embodiment 4.

In FIG. 5, an echo canceler 400 comprises a subtraction filter 101 for generating a first estimated echo signal and a first residual signal; an update filter 403 for generating a second estimated echo signal and a second residual signal by executing the coefficient update of the filter coefficient sequence and by using the updated filter coefficient sequence; a signal-to-echo ratio calculating unit 407 for computing the signal-to-echo ratio; a residual echo suppression quantity calculating unit 408 for computing the suppression quantity of the residual echo; a residual echo suppressing unit 409 for suppressing the residual echo; first, second and fourth time-frequency conversion units 401, 402 and 406 for obtaining frequency elements by the time-frequency conversion of the time signal; and third and fifth time-frequency conversion units 404 and 410 for carrying out reverse conversion from the frequency elements to the time signal.

Furthermore, the subtraction filter 101 comprises an estimated response signal generating unit 101a and a subtractor 101b, and the update filter 403 comprises a filter processing unit 403a.

Next, the operation of the echo canceler 400 of the embodiment 4 in accordance with the present invention will be described.

The echo canceler 400 comprises the first to fifth time-frequency conversion units 401, 402, 404, 406 and 410 for carrying out the time-frequency conversion. Accordingly, it executes its processing after dividing the signal into blocks with a prescribed block length L. In the following description, it is assumed that the block number from the start point of the processing is denoted by k.

The subtraction filter 101 generates, when acquiring the received signal x(n), the first estimated echo signal $\hat{y}_1(n)$ through the filter processing using the filter coefficient sequence $\hat{h}(k)$ obtained up to the previous operation, and obtains the first residual signal $d_1(n)$ by subtracting the signal $\hat{y}_1(n)$ from the microphone input signal y'(n).

The first time-frequency conversion unit 401 obtains the frequency elements $X(\omega,k)$ of the received signal x(n) by carrying out the time-frequency conversion of the received signal x(n) for each block length L. Here $\omega$ is an index denoting frequency. In addition, as the time-frequency conversion here, the DFT (discrete Fourier transform) can be used, for example. Likewise, the second time-frequency conversion unit 402 carries out the time-frequency conversion of the first residual signal $d_1(n)$ to obtain the frequency elements $D_1(\omega,k)$ of the first residual signal.

Using the frequency elements $X(\omega,k)$ of the received signal x(n), the frequency elements $D_1(\omega,k)$ of the first residual signal $d_1(n)$ and the arbitrary update step sizes $\mu(\omega,k)$ determined for the individual frequency elements, the update filter 403 updates the frequency elements $\hat{H}(k)$ of the filter coefficient sequence, which are obtained as a result of the operation up to the previous operation, according to the prescribed adaptive algorithm, thereby obtaining the frequency elements $\hat{H}(k+1)$ of the updated filter coefficient sequence.

Incidentally, as an example of the update filter in such a frequency domain, there is a high speed LMS algorithm described in the following Reference 2. As an alternative method, it is also possible to use an MDF (Multi Delay Filter) based on the high speed LMS algorithm.

Reference 2: S. Haykin, "Adaptive Filter Theory" translated by Hiroshi SUZUKI, et al., Kagaku Gijutsu Shuppan, Inc. Jan. 10, 2001, pp. 500-514.

The update filter 403 carries out filter processing of the frequency elements $X(\omega,k)$ of the received signal x(n) using the frequency elements $\hat{H}(k)$ of the updated filter coefficient sequence, and obtains the frequency elements $\hat{Y}_2(\omega,k)$ of the second estimated echo signal. The third time-frequency conversion unit 404 carries out reverse conversion of the frequency elements $\hat{Y}_2(\omega,k)$ of the second estimated echo signal from the frequency elements to the time signal, and obtains the second estimated echo signal $\hat{y}_2(n)$. A first subtractor 405 obtains the second residual signal $d_2(n)$ by subtracting the second estimated echo signal $\hat{y}_2(n)$ from the microphone input signal y'(n), and the fourth time-frequency conversion unit 406 carries out the time-frequency conversion of the second residual signal $d_2(n)$ and obtains the frequency elements $D_2(\omega,k)$ of the second residual signal.

Using the frequency elements $D_1(\omega,k)$ of the first residual signal $d_1(n)$, the frequency elements $D_2(\omega,k)$ of the second residual signal $d_2(n)$ and the update step sizes $\mu(\omega,k)$ the signal-to-echo ratio calculating unit 407 computes the signal-to-echo ratios $SE(\omega,k)$ for the individual frequency elements. Incidentally, depending on the adaptive algorithm used, the frequency elements $X(\omega,k)$ of the input signal are also used for the calculation. In the case of the foregoing high speed LMS algorithm, the signal-to-echo ratio $SE(\omega,k)$ is determined by the following Expression (28), for example.

$$SE(\omega, k) = \left\{ \frac{1}{2}\mu(\omega, k) - \frac{1}{2}\frac{1}{\mu(\omega, k)}\frac{1}{|X(\omega, k)|^2}\left(\frac{|D_2(\omega, k)|^2 - |D_1(\omega, k)|^2}{|D_1(\omega, k)|^2}\right) \right\}^{-1} \quad (28)$$

The residual echo suppression quantity calculating unit 408 computes the residual echo suppression quantity $\gamma(\omega,k)$ for each frequency using the signal-to-echo ratio $SE(\omega,k)$ obtained by the signal-to-echo ratio calculating unit 407. Furthermore, the residual echo suppressing unit 409 suppresses the residual echo by multiplying the frequency elements $D_1(\omega,k)$ of the first residual signal $d_1(n)$ by the residual echo suppression quantities $\gamma(\omega,k)$ for the individual frequencies computed by the residual echo suppression quantity calculating unit 408. The fifth time-frequency conversion unit 410 carries out the reverse conversion of the output signal $S'(\omega,k)$ obtained in this way from the frequency elements to the time signal, thereby outputting the output signal s'(n).

By thus suppressing the residual echoes for the individual frequencies, the residual echo suppression which corresponds to the estimated echo signal, the near-end signal generation condition and the convergence state of the update filter becomes possible. For example, when the near-end signal condition varies depending on the frequency band such as when the near-end signal is large in a particular frequency band and is small in another frequency band, sufficient residual echo suppression is carried out in the frequency band where the near-end signal is large because the power of the residual echo signal is high, but weaker residual echo suppression is carried out in the frequency band where the near-end signal is small because the power of the residual echo signal is low. Thus, the deterioration of the near-end signal can be reduced.

As described above, according to the present embodiment 4, it is configured in such a manner as to comprise the first to fifth time-frequency conversion units 401, 402, 404, 406 and 410 for carrying out the time-frequency conversion, the signal-to-echo ratio calculating unit 407 for computing the signal-to-echo ratio corresponding to the noise condition and the convergence state of the update filter for each frequency element, and the residual echo suppression quantity calculating unit 408 and the residual echo suppressing unit 409 for carrying out the residual echo suppression using the signal-to-echo ratio calculated. Accordingly, it can perform the residual echo suppression corresponding to the magnitude of the near-end signal for each frequency band. More specifically, it suppresses a residual echo feeling by increasing the residual echo suppression quantity in a frequency band where the near-end signal is large and by reducing the residual echo suppression quantity in a frequency band where the near-end signal is small, thereby being able to reduce the deterioration in the send voice signal contained in the near-end signal.

Embodiment 5

Although the foregoing embodiment 4 shows a configuration for calculating the signal-to-echo ratio for each frequency band using the time-frequency conversion, the present embodiment 5 shows a configuration which carries out, when high frequency resolution is not required, the residual echo suppression processing corresponding to the near-end signal condition and the convergence state of the update filter for each subband using a subband filter.

Figure 6:
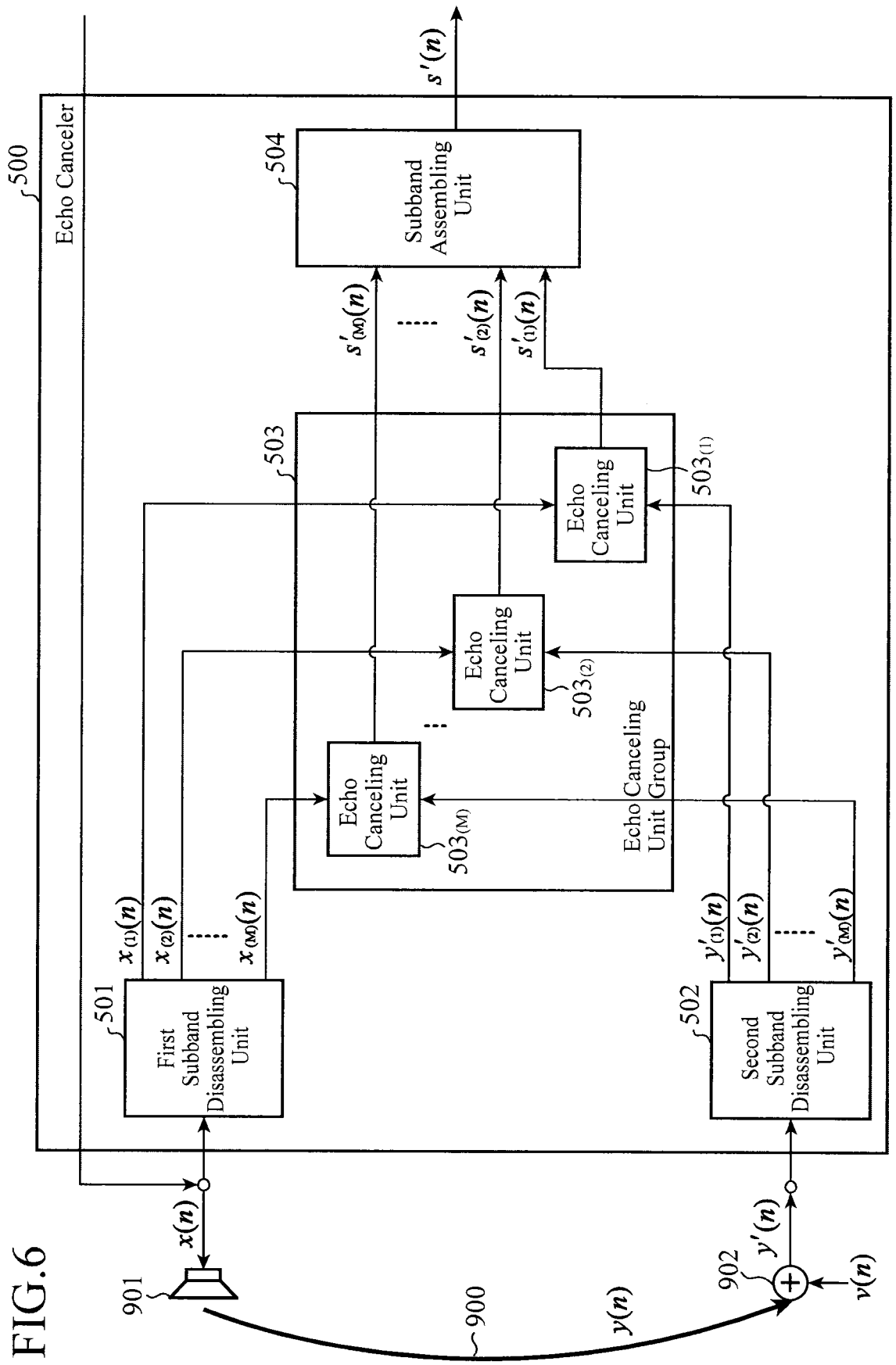
FIG. 6 is a block diagram showing a configuration of an echo canceler of an embodiment 5.

FIG. 6 is a block diagram showing a configuration of an echo canceler of the embodiment 5. In FIG. 6, the echo canceler 500 comprises a first subband disassembling unit 501, a second subband disassembling unit 502, an echo canceling unit group 503 having a plurality of echo canceling units arranged which have the functions shown in the foregoing embodiment 1 or 3, and a subband assembling unit 504.

Next, the operation of the echo canceler 500 of the embodiment will be described.

The first subband disassembling unit 501 divides the received signal x(n) supplied to the echo path 900 to M bands, where M is a prescribed division number, and obtains the received signals $x_{(1)}(n), x_{(2)}(n), \ldots, x_{(M)}(n)$ divided into subbands. Likewise, the second subband disassembling unit 502 divides the microphone input signal y'(n) to M frequency bands, and obtains the microphone input signals $y'_{(1)}(n), y'_{(2)}(n), \ldots, y'_{(M)}(n)$ divided into subbands.

Corresponding to the M subbands, the echo canceling unit group 503 consists of a set of the echo canceling units $503_{(1)}, 503_{(2)}, \ldots, 503_{(M)}$ (referred to as the echo canceling unit group 503 generically from now on). The echo canceler described in the embodiment 1 or 3 is applicable to each unit in the echo canceling unit group 503, which corresponds to each subband. Accordingly, in the echo canceling unit group 503, for the M pairs of the received signals x(n) and the microphone input signals y'(n) divided into the subbands, the individual subband echo canceling units 503 carry out the processing to obtain M output signals $s'_{(1)}(n), s'_{(2)}(n), \ldots, s'_{(M)}(n)$ undergoing the subband disassembly. The subband assembling unit 504 carries out subband assembly of the subband disassembled output signals $s'_{(1)}(n), s'_{(2)}(n), \ldots, s'_{(M)}(n)$ and obtains the output signal s'(n).

As described above, according to the present embodiment 5, it is configured in such a manner as to comprise the first subband disassembling unit 501 for dividing the received signal x(n) into the frequency bands; the second subband disassembling unit 502 for dividing the microphone input signal y'(n) into the frequency bands; the echo canceling unit group 503 for carrying out the residual echo suppression processing of the individual signals passing through the division into the frequency bands; and the subband assembling unit 504 for carrying out subband assembly of the output signals of the subband disassembly. Accordingly, even if the near-end signal condition and the convergence state of the update filter differ from frequency band to frequency band, it can reduce the residual echo more quickly and to a sufficiently smaller value.

Incidentally, as for the echo cancelers from the foregoing embodiments 3 to 5, an echo detector for detecting an echo can be configured in the same manner as the echo detector shown in the embodiment 2 by making a decision as to whether the residual echo quantity is not less than a threshold with respect to the send voice signal using the signal-to-echo ratio SE(n) of the residual signal after subtracting the estimated echo computed through the adaptive filter. Incidentally, when configuring the echo detector, the fifth time-frequency conversion unit 410 shown in the embodiment 4 and the subband assembling unit 504 shown in the embodiment 5 can be removed. Applying the configurations of the echo cancelers from the embodiment 3 to 5 to the echo detectors enables detecting the residual echo accurately even if the echo path varies.

Incidentally, it is to be understood that a free combination of the individual embodiments, variations of any components of the individual embodiments or removal of any components of the individual embodiments are possible within the scope of the present invention.

INDUSTRIAL APPLICABILITY

As described above, an echo canceler and an echo detector in accordance with the present invention are capable of suppressing the occurrence of the residual echo even if the telephone conversation is carried out under large noise or the echo path varies, and are capable of providing a good telephone conversation environment without hindering the telephone conversation by excessively suppressing the send voice. Accordingly, it is applicable to a technique for detecting an echo of the received signal mixed into the send signal and for canceling out the detected echo from the send signal.

DESCRIPTION OF REFERENCE SYMBOLS 100, 110, 300, 400, 500 echo canceler; 101 subtraction filter; 101' first subtraction filter; 101a, 101a', 301a estimated response signal generating unit; 101b, 101b', 301b subtractor; 102, 403 update filter; 102' first update filter; 102a, 102a', 106a, 403a filter processing unit; 102b, 102b', 106b subtractor; 103, 302, 407 signal-to-echo ratio calculating unit; 104, 408 residual echo suppression quantity calculating unit; 105, 409 residual echo suppressing unit; 106 second update filter; 200 echo detector; 201 echo detecting unit; 301 second subtraction filter; 303 delay processing unit; 401 first time-frequency conversion unit; 402 second time-frequency conversion unit; 404 third time-frequency conversion unit; 406 fourth time-frequency conversion unit; 410 fifth time-frequency conversion unit; 501 first subband disassembling unit; 502 second subband disassembling unit; 503 echo canceling unit group; 504 subband assembling unit; 900 echo path; 901 speaker; 902 microphone.

What is claimed is:
1. An echo canceler for removing an echo component which is obtained by picking up a received signal with a microphone and is contained in a microphone input signal, the echo canceler comprising:
a signal-to-echo ratio calculating unit for computing a signal-to-echo ratio indicating a ratio of the echo component to the received signal from a combination of a first residual signal, a second residual signal, and an update step size of an updated filter coefficient sequence, the first residual signal being obtained by filtering the microphone input signal using a filter coefficient sequence, the updated filter coefficient sequence being obtained by updating the filter coefficient sequence used for the first residual signal with the update step size, the second residual signal being obtained by filtering the microphone input signal using the updated filter coefficient sequence; and an echo suppressing unit for suppressing the echo component contained in the microphone input signal in accordance with the signal-to-echo ratio the signal-to-echo ratio calculating unit computes.

2. The echo canceler according to claim 1, wherein the second residual signal is a plurality of residual signals obtained by using a plurality of updated filter coefficient sequences that are obtained by subjecting the filter coefficient sequence of the update filter which is obtained up to the previous operation, to a coefficient update using a plurality of arbitrary update step sizes different from each other; and the signal-to-echo ratio calculating unit computes the signal-to-echo ratio from at least two residual signals selected from a set of the first residual signal and the plurality of the second residual signals.

3. The echo canceler according to claim 1, wherein the signal-to-echo ratio calculating unit uses the updated filter coefficient sequence as further information for computing the signal-to-echo ratio.

4. The echo canceler according to claim 1, wherein the signal-to-echo ratio calculating unit uses the received signal as further information for computing the signal-to-echo ratio.

5. The echo canceler according to claim 1, wherein the signal-to-echo ratio calculating unit, using a block adaptive algorithm that executes the coefficient update in units of a prescribed signal block length, obtains variance or average power of the first residual signal and/or of the second residual signal in the units of the prescribed signal block length, and uses the variance or average power as further information for computing the signal-to-echo ratio.

6. The echo canceler according to claim 1, further comprising:

a subtraction filter for generating a first estimated echo signal by executing filter processing of the received signal using the filter coefficient sequence of the update filter which is obtained up to the previous operation, and for generating the first residual signal by subtracting the generated first estimated echo signal from the microphone input signal; and an update filter for updating the filter coefficient sequence of the update filter using the received signal, the first residual signal generated by the subtraction filter and the arbitrary update step size, for generating a second estimated echo signal by executing filter processing of the received signal using the updated filter coefficient sequence, and for generating the second residual signal by subtracting the second estimated echo signal from the microphone input signal, wherein the signal-to-echo, ratio calculating unit determines the signal-to-echo ratio using at least the first residual signal the subtraction filter generates, the second residual signal the update filter generates and the update step size; and the echo suppressing unit computes a suppression quantity of the echo component contained in the microphone input signal from the signal-to-echo ratio the signal-to-echo ratio calculating unit determines, and suppresses the echo component by executing processing using the suppression quantity and the first residual signal computed.

7. The echo canceler according to claim 6, wherein the update filter generates a plurality of second estimated echo signals by executing filter processing of the received signal using a plurality of updated filter coefficient sequences which are computed using a plurality of arbitrary update step sizes, and generates a plurality of second residual signals by subtracting the plurality of the second estimated echo signals from the microphone input signal; and the signal-to-echo ratio calculating unit determines the signal-to-echo ratio using at least two residual signals selected from a set of the first residual signal and the plurality of the second residual signals and using the update step sizes.

8. The echo canceler according to claim 1, wherein a first subtraction filter for generating a first estimated echo signal by executing filter processing of the received signal using the filter coefficient sequence of the update filter obtained up to the operation before last, and for generating the first residual signal by subtracting the generated first estimated echo signal from the microphone input signal;

a second subtraction filter for generating a second estimated echo signal by executing filter processing of the received signal using the filter coefficient sequence of the update filter which is obtained up to the previous operation, and for generating the second residual signal by subtracting the generated second estimated echo signal from the microphone input signal, wherein the signal-to-echo ratio calculating unit determines the signal-to-echo ratio using at least the first residual signal the first subtraction filter generates, the second residual signal the second subtraction filter generates and the update step size used for updating the update filter in the previous operation; and the echo suppressing unit computes a suppression quantity of the echo component contained in the microphone input signal from the signal-to-echo ratio the signal-to-echo ratio calculating unit determines, and suppresses the echo component by executing processing using the suppression quantity and the first residual signal computed.

9. The echo canceler according to claim 6, further comprising:

a time-frequency conversion unit for obtaining frequency elements by carrying out frequency conversion of the received signal, the first residual signal and the second residual signal which are changing with time; and a frequency-time conversion unit for obtaining time elements by carrying out time conversion of the signal that undergoes the suppression of the echo component by the echo suppressing unit, wherein the signal-to-echo ratio calculating unit determines the signal-to-echo ratios for the individual frequency elements from the frequency elements of at least the first residual signal and/or second residual signal and the update step size, which undergo the frequency conversion by the time-frequency conversion unit;

the echo suppressing unit computes suppression quantities of the echo components contained in the microphone input signal from the signal-to-echo ratios the signal-to-echo ratio calculating unit determines for the individual frequency elements, and generates an output signal that undergoes suppression of the echo components by executing processing using the suppression quantities computed and the first residual signal; and the frequency-time conversion unit obtains the time elements by carrying out time conversion of the output signal the echo suppressing unit generates.

10. The echo canceler according to claim 8, further comprising:

a time-frequency conversion unit for obtaining frequency elements by carrying out frequency conversion of the received signal, the first residual signal and the second residual signal which are changing with time; and a frequency-time conversion unit for obtaining time elements by carrying out time conversion of the signal that undergoes the suppression of the echo component by the echo suppressing unit, wherein the signal-to-echo ratio calculating unit determines the signal-to-echo ratios for the individual frequency elements from the frequency elements of at least the first residual signal and/or second residual signal and the update step size, which undergo the frequency conversion by the time-frequency conversion unit;

the echo suppressing unit computes suppression quantities of the echo components contained in the microphone input signal from the signal-to-echo ratios the signal-to-echo ratio calculating unit determines for the individual frequency elements, and generates an output signal that undergoes suppression of the echo components by executing processing using the suppression quantities computed and the first residual signal; and the frequency-time conversion unit obtains the time elements by carrying out time conversion of the output signal the echo suppressing unit generates.

11. An echo canceler for removing an echo component which is obtained by picking up a received signal with a microphone and is contained in a microphone input signal, the echo canceler comprising:

a subband disassembling unit for splitting the received signal and the microphone input signal into subbands;

a signal-to-echo ratio calculating unit for computing signal-to-echo ratios indicating ratios of the echo components to the received signal which is split into the subbands by the subband disassembling unit, from a combination of a first residual signal, a second residual signal and an update step size of an updated filter coefficient sequence, the first residual signal being obtained by filtering the microphone input signal using a filter coefficient sequence, the updated filter coefficient sequence being obtained by updating the filter coefficient sequence used for the first residual signal with the update step size, the second residual signal being obtained by filtering the microphone input signal using the updated filter coefficient sequence;

an echo suppressing unit for generating output signals that undergo the suppression of the echo components contained in the microphone input signal which is split into the subbands in accordance with the signal-to-echo ratios the signal-to-echo ratio calculating unit computes; and a subband assembling unit for executing subband assembly of the output signals the echo suppressing unit generates for the individual subbands.

12. An echo detector for detecting an echo component which is obtained by picking up a received signal with a microphone and is contained in a microphone input signal, the echo detector comprising:

a signal-to-echo ratio calculating unit for computing a signal-to-echo ratio that is a ratio of the echo component to the received signal from a combination of a first residual signal, a second residual signal, and an update step size of an updated filter coefficient sequence, the first residual signal being obtained by filtering the microphone input signal using a filter coefficient sequence, the updated filter coefficient sequence being obtained by updating the filter coefficient sequence used for the first residual signal with the update step size, the second residual signal being obtained by filtering the microphone input signal using the updated filter coefficient sequence; and an echo detecting unit for detecting the echo component in accordance with the signal-to-echo ratio the signal-to-echo ratio calculating unit computes.

13. The echo detector according to claim 12, wherein the second residual signal is a plurality of residual signals obtained by using a plurality of updated filter coefficient sequences that are obtained by subjecting the filter coefficient sequence of the update filter which is obtained up to the previous operation, to a coefficient update using a plurality of arbitrary update step sizes different from each other; and the signal-to-echo ratio calculating unit computes the signal-to-echo ratio from at least two residual signals selected from a set of the first residual signal and the plurality of the second residual signals.

14. The echo detector according to claim 12, wherein the signal-to-echo ratio calculating unit uses the updated filter coefficient sequence as further information for computing the signal-to-echo ratio.

15. The echo detector according to claim 12, wherein the signal-to-echo ratio calculating unit uses the received signal as further information for computing the signal-to-echo ratio.

16. The echo detector according to claim 12, wherein the signal-to-echo ratio calculating unit, using a block adaptive algorithm that executes the coefficient update in units of a prescribed signal block length, obtains variance or average power of the first residual signal and/or of the second residual signal in the units of the prescribed signal block length, and uses the variance or average power as further information for computing the signal-to-echo ratio.

17. The echo detector according to claim 12, further comprising:

a subtraction filter for generating a first estimated echo signal by executing filter processing of the received signal using the filter coefficient sequence of the update filter which is obtained up to the previous operation, and for generating the first residual signal by subtracting the generated first estimated echo signal from the microphone input signal; and an update filter for updating the filter coefficient sequence of the update filter using the received signal, the first residual signal generated by the subtraction filter and the arbitrary update step size, for generating a second estimated echo signal by executing filter processing of the received signal using the updated filter coefficient sequence, and for generating the second residual signal by subtracting the second estimated echo signal from the microphone input signal, wherein the signal-to-echo ratio calculating unit determines the signal-to-echo ratio using at least the first residual signal the subtraction filter generates, the second residual signal the update filter generates and the update step size; and the echo detecting unit, referring to the signal-to-echo ratio the signal-to-echo ratio calculating unit determines, detects the echo component when an echo component not less than a prescribed threshold with respect to the received signal is present.

18. The echo detector according to claim 17, wherein the update filter generates a plurality of second estimated echo signals by executing filter processing of the received signal using a plurality of updated filter coefficient sequences which are computed using a plurality of arbitrary update step sizes, and generates a plurality of second residual signals by subtracting the plurality of the second estimated echo signals from the microphone input signal; and the signal-to-echo ratio calculating unit determines the signal-to-echo ratio using at least two residual signals selected from a set of the first residual signal and the plurality of the second residual signals and using the update step size.

19. The echo detector according to claim 12, wherein a first subtraction filter for generating a first estimated echo signal by executing filter processing of the received signal using the filter coefficient sequence of the update filter obtained up to the operation before last, and for generating the first residual signal by subtracting the generated first estimated echo signal from the microphone input signal; and a second subtraction filter for generating a second estimated echo signal by executing filter processing of the received signal using the filter coefficient sequence of the update filter which is obtained up to the previous operation, and for generating the second residual signal by subtracting the generated second estimated echo signal from the microphone input signal, wherein the signal-to-echo ratio calculating unit determines the signal-to-echo ratio using at least the first residual signal the first subtraction filter generates, the second residual signal the second subtraction filter generates and the update step size used for updating the update filter in the previous operation; and the echo detecting unit, referring to the signal-to-echo ratio the signal-to-echo ratio calculating unit determines, detects the echo component when an echo component not less than a prescribed threshold with respect to the received signal is present.

20. The echo detector according to claim 17, further comprising:

a time-frequency conversion unit for obtaining frequency elements by carrying out frequency conversion of the received signal, the first residual signal and the second residual signal which are changing with time, wherein the signal-to-echo ratio calculating unit determines the signal-to-echo ratios for the individual frequency elements from the frequency elements of at least the first residual signal and/or second residual signal and the update step size, which undergo the frequency conversion by the time-frequency conversion unit; and the echo detecting unit, referring to the signal-to-echo ratios for the individual frequency elements the signal-to-echo ratio calculating unit determines, detects the echo component when an echo component not less than a prescribed threshold with respect to the received signal is present for a frequency element.

21. The echo detector according to claim 19, further comprising:

a time-frequency conversion unit for obtaining frequency elements by carrying out frequency conversion of the received signal, the first residual signal and the second residual signal which are changing with time, wherein the signal-to-echo ratio calculating unit determines the signal-to-echo ratios for the individual frequency elements from the frequency elements of at least the first residual signal and/or second residual signal and the update step size, which undergo the frequency conversion by the time-frequency conversion unit; and the echo detecting unit, referring to the signal-to-echo ratios for the individual frequency elements the signal-to-echo ratio calculating unit determines, detects the echo component when an echo component not less than a prescribed threshold with respect to the received signal is present for a frequency element.

22. An echo detector for detecting an echo component which is obtained by picking up a received signal with a microphone and is contained in a microphone input signal, the echo detector comprising:

a subband disassembling unit for splitting the received signal and the microphone input signal into subbands;

a signal-to-echo ratio calculating unit for determining signal-to-echo ratios indicating ratios of the echo components to the received signal which is split into the subbands by the subband disassembling unit, from a combination of a first residual signal, a second residual signal, and an update step size of an updated filter coefficient sequence, the first residual signal being obtained by filtering the microphone input signal using a filter coefficient sequence, the updated filter coefficient sequence being obtained by updating the filter coefficient sequence used for the first residual signal with the update step size, the second residual signal being obtained by filtering the microphone input signal using the updated filter coefficient sequence; and the echo detecting unit, referring to the signal-to-echo ratio for each subband the signal-to-echo ratio calculating unit determines, detects the echo component when an echo component not less than a prescribed threshold with respect to the received signal is present.

* * * * *